No. 888,236. PATENTED MAY 19, 1908.
A. HATTU.
APPARATUS FOR VIEWING PANORAMIC PICTURES.
APPLICATION FILED JULY 21, 1906.

2 SHEETS—SHEET 1.

WITNESSES
W. P. Burke
A. F. Heuman

INVENTOR
Albert Hattu
By Richardson
ATTYS

No. 888,236. PATENTED MAY 19, 1908.
A. HATTU.
APPARATUS FOR VIEWING PANORAMIC PICTURES.
APPLICATION FILED JULY 21, 1906.

2 SHEETS—SHEET 2.

WITNESSES
INVENTOR
Albert Hattu
ATT'YS.

UNITED STATES PATENT OFFICE.

ALBERT HATTU, OF PARIS, FRANCE, ASSIGNOR TO SOCIETE ANONYME PERIPHOTE ET PHOTORAMA, OF PARIS, FRANCE.

APPARATUS FOR VIEWING PANORAMIC PICTURES.

No. 888,236.     Specification of Letters Patent.     Patented May 19, 1908.

Application filed July 21, 1906. Serial No. 327,200.

*To all whom it may concern:*

Be it known that I, ALBERT HATTU, citizen of France, residing at Paris, in France, have invented new and useful Improvements in Apparatus for Viewing Panoramic Pictures, of which the following is a specification.

This invention relates to apparatus adapted for use in viewing panoramic pictures of small dimensions obtained either by photography or otherwise. When said pictures developed upon a plane surface are examined or viewed the panoramic illusion is not obtained, and when they are circularly disposed it would be necessary, for obtaining this illusion, that the point of vision of the spectator be located in the center of the panorama which in the case in question is of too small a diameter, to render this possible.

The apparatus diagrammatically represented in the annexed drawing permits of the spectator obtaining the desired illusion with the eye at a point exteriorly of the panorama.

Figure 1:
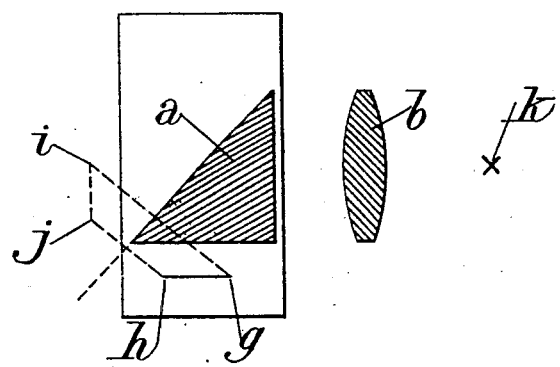
Figure 2:
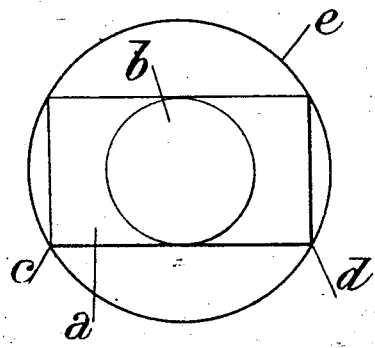
Figure 3:
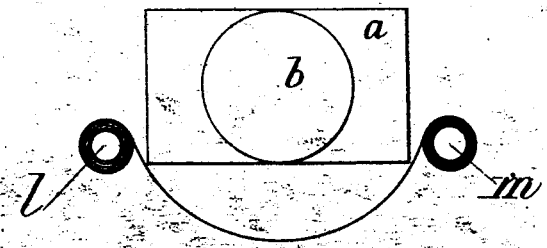
Figure 5:
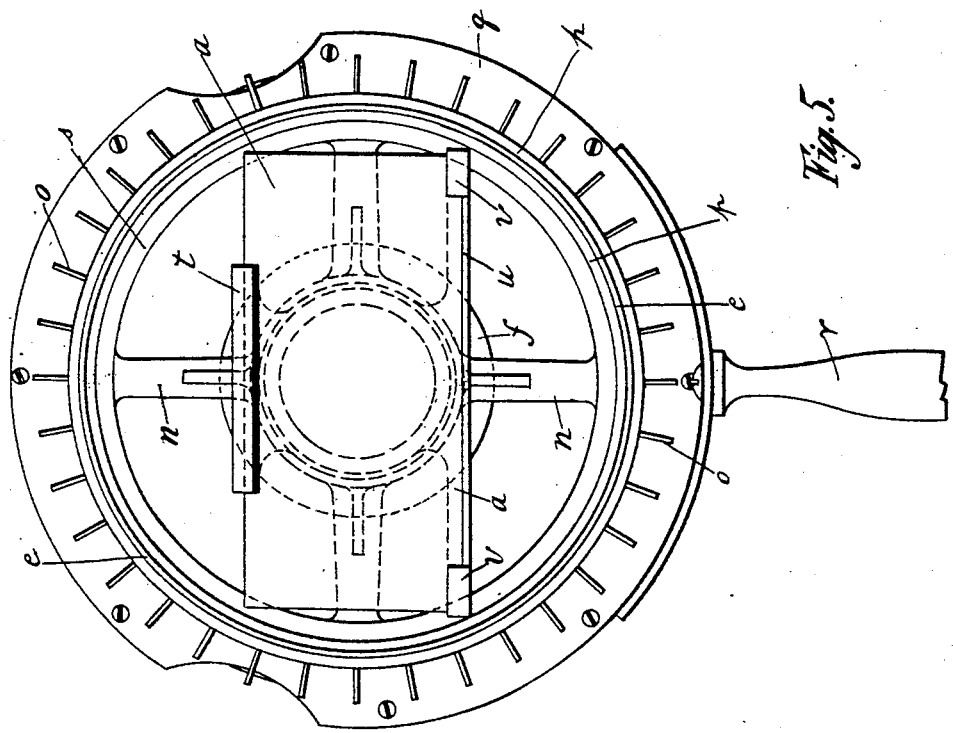
Figure 4:
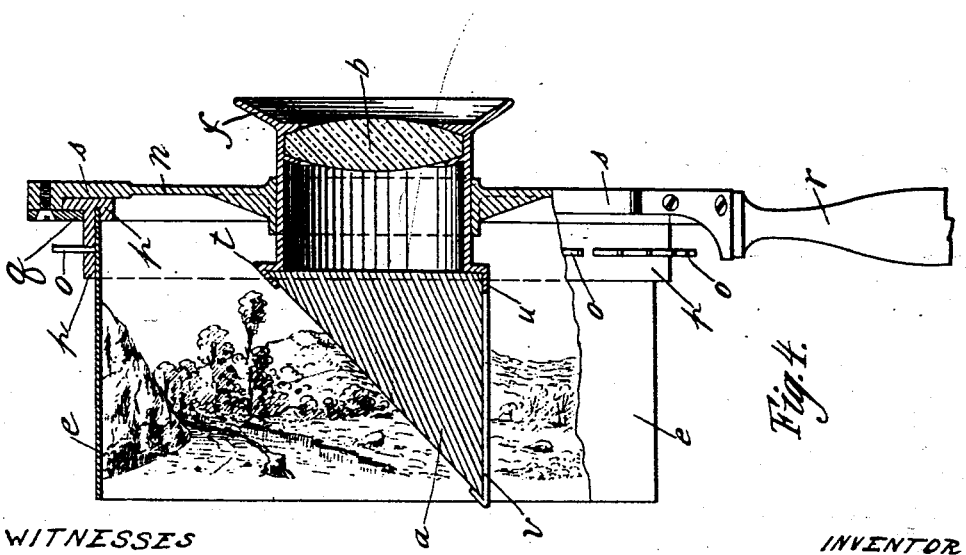

Figure 1 is a diagrammatic vertical section of the apparatus. Fig. 2 is a front view thereof. Fig. 3 is a diagram showing the same device used for viewing a panorama having a non-continuous or unclosed surface. Fig. 4 is a part side elevation and a part sectional view of a device in which the invention is embodied. Fig. 5 is a rear view thereof.

A total reflection prism $a$ (Figs. 1 and 2) is placed as indicated in the drawing within the panorama $c$, $d$, $e$ with its longitudinal edges parallel to the diameter of the circumference of said panorama and the center of its hypotenuse lying on the axial line of the panorama or substantially so. The portion $c\,d$ of the picture is reflected by the prism and a vertical image symmetrical with the actual picture is formed. A line $g$, $h$ for example on the actual picture is seen at $i$, $j$ (Fig. 1) by the observer placing his eye in front of the prism $a$ at a point $k$ exteriorly of the panorama. There is interposed between the eye of the observer and the prism $a$ a biconvex lens $b$ the purpose of which is simply to magnify the virtual image seen by the eye from the point $k$.

The more the longitudinal edges of the prism $a$ are extended the larger will be the portion of the reflected picture All the different parts of the circular panorama may be viewed by rotating same about its horizontal axis, as shown in Figs. 4 and 5. In these figures the picture $e$ is held in the piece $p$ which can turn by sliding in a groove between the pieces $q$ and $s$, connected together by screws. This piece $s$ is fixed to a handle $r$, by which the observer supports the apparatus.

The lens $b$ is placed in the piece $f$ supported by a socket connected to piece $s$ by arms $n$. This piece $f$ is rigidly connected with the supports $t$, $u$, $v$ which hold the prism $a$ by the corners (see Fig. 5). The observer holding the handle $r$ by one hand can by using the other on the pins $o$ make the ring $p$ turn and consequently the picture $e$. A panorama may also be used having a non-continuous or unclosed surface. It will then be arranged as shown in Fig. 3 to permit being rolled or unrolled on rollers $l$ and $m$ and the circular or curved portion of the surface comprised between said rollers may be viewed by means of a prism $a$ and lens $b$ arranged in a similar manner as for viewing the closed or continuous circular panorama.

What I claim as my invention and desire to secure by Letters Patent of the United States is:—

1. The combination with a curved panorama of a total reflection prism so positioned with respect thereto as to produce a reflected virtual image at right angles to the picture of said panorama.

2. The combination with a continuous rotatable panorama of a total reflection prism so positioned with respect thereto as to produce a reflected virtual image at right angles to the picture of said panorama.

3. The combination with a curved panorama of a total reflection prism so positioned with respect thereto as to produce a reflected virtual image at right angles to the picture of said panorama and a magnifying lens located between said prism and the point of vision.

4. The combination with a continuous rotatable panorama of a total reflection prism so positioned with respect thereto as to produce a reflected virtual image at right angles to the picture of said panorama and a magnifying lens located between said prism and the point of vision.

5. The combination with a continuous rotatable panorama of a total reflection prism placed within same adapted to produce a reflected virtual image at right angles to the picture of said panorama from a point of vision exterior to said panorama.

6. The combination with a continuous rotatable panorama of a total reflection prism placed within same adapted to produce a reflected virtual image at right angles to the picture of said panorama from a point of vision exterior to said panorama and a magnifying lens located between said prism and the point of vision.

7. The combination with a circular rotatable panorama of a total reflection prism located within same having its longitudinal edges parallel to the diameter of said panorama and the center of its hypotenuse substantially coincident with the axis thereof, said prism being adapted to produce a reflected virtual image at right angles to the picture of the panorama visible from a point of vision exterior to said panorama.

8. The combination with a circular rotatable panorama of a total reflection prism located within same, having its longitudinal edges parallel to the diameter of said panorama and the center of its hypotenuse substantially coincident with the axis thereof, said prism being adapted to produce a reflected virtual image at right angles to the picture of the panorama visible from a point of vision exterior to said panorama and a magnifying lens located between said prism and the point of vision.

In witness whereof I have signed this specification in the presence of two witnesses.

ALBERT HATTU.

Witnesses:
 ANDRÉ MIGOUT, Jr.,
 JULES VERNAY.